Feb. 12, 1924.　　　　　　　　　　　　　　　　　1,483,668
L. F. LITTLE
METHOD OF AND APPARATUS FOR TREATING ORGANIC SUBSTANCES
Filed May 14, 1923　　2 Sheets-Sheet 1
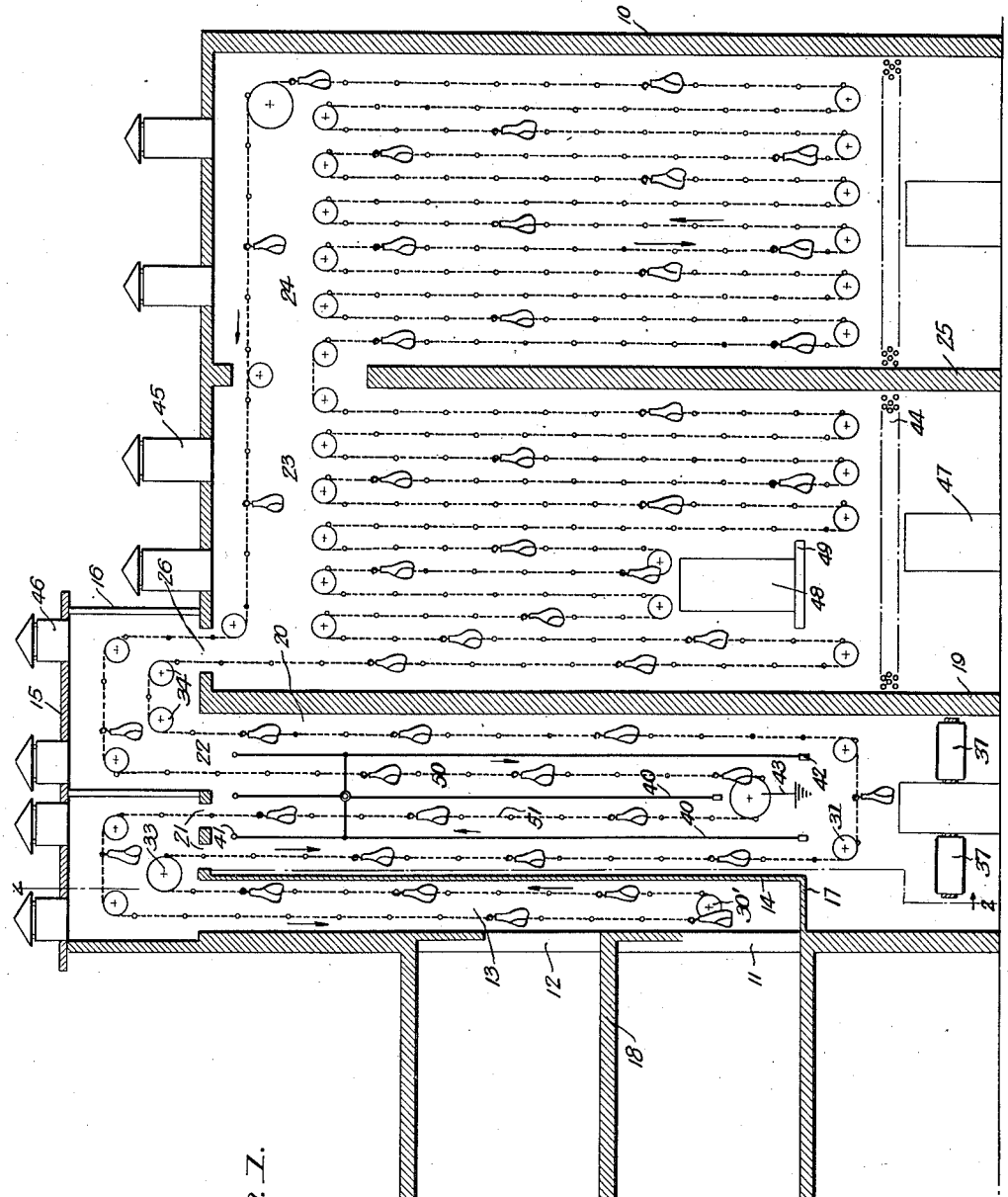
Fig. I.
Inventor
L. F. Little
By Cushman, Bryant Darby
Attorneys

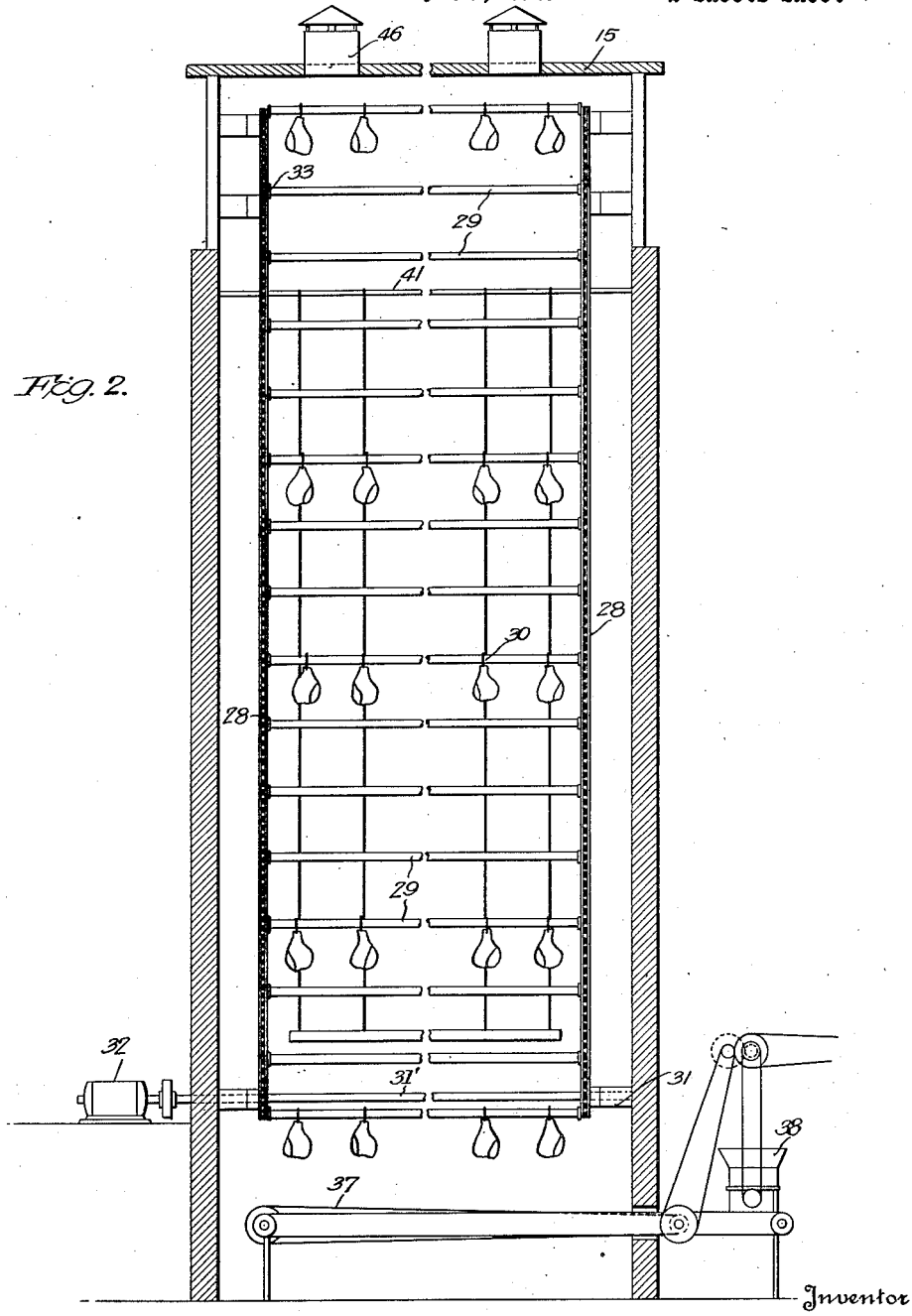

Patented Feb. 12, 1924.

1,483,668

UNITED STATES PATENT OFFICE.

LUCIUS F. LITTLE, OF OWENSBORO, KENTUCKY.

METHOD OF AND APPARATUS FOR TREATING ORGANIC SUBSTANCES.

Application filed May 14, 1923. Serial No. 638,917.

*To all whom it may concern:*

Be it known that I, LUCIUS F. LITTLE, a citizen of the United States, residing at Owensboro, in the county of Daviess and State of Kentucky, have invented new and useful Improvements in Methods of and Apparatus for Treating Organic Substances, of which the following is a specification.

The present invention relates to a method and apparatus for curing or conditioning organic substances, such as meat, for the purpose of imparting thereto the flavor of some particular treating agent, such as smoke.

The invention is intended, primarily, for the smoking of meat while electrified in accordance with the general method disclosed in the patents to Alsop, 1,402,203 and 1,402,204, granted Jan. 3, 1922.

An object of the invention is to provide a method which will satisfactorily introduce and incorporate the smoke into the meat and impart to the meat the bright appearance which characterizes meat treated by ordinary methods.

Another object of the invention is to provide an apparatus which will permit the continuous smoking and drying of the meat after curing, thereby materially shortening the duration of the treatment and the labor involved in carrying out the method.

Another object of the invention is to provide a method and apparatus which will, in one treatment, condition meats which have been cured by different processes, such as pickle cured, and salt cured meats, and will effect the conditioning of the meats cured by the several processes within the same period of time.

The patents referred to disclose a method and apparatus in which the meat is passed through an electric field within a suitable container and are, at the same time, subjected to the action of a smoking agent. I have found that if the meat is subjected to this treatment immediately after it is cured, or within a comparatively short time, so that its surface has not dried, and is subsequently conditioned, the smoke will, during the conditioning or drying, be more thoroughly and satisfactorily introduced into the meat. In practicing the methods heretofore employed the wet meat, as it comes from the curing treatment, is first dried out by the smoking fires before it begins to take up the smoke. The drying action of the fires tends to harden the surface of the meat, and as a result, when the meat begins to take up the smoke, the latter is not efficiently introduced into the interior thereof.

I have discovered that by taking the meat before it is dried and simultaneously electrifying and smoking the same, the smoke will be quickly deposited upon the meat without drying or hardening its surface, and during the subsequent drying or conditioning it will be thoroughly diffused throughout the body of the meat.

I have further found that by introducing the meat, as it comes from the drying chamber, again into the smoking and electrifying chamber to subject it to a final smoking and electrification, the meat is given the brilliant varnish-like surface which is desirable.

Another feature of the invention is the provision of a method and apparatus for simultaneously treating meats which have been cured by different processes. There are several processes by which meat may be cured, for instance, the box cure, the dry salt cure and the sweet pickle cure. Ordinarily it requires about two hours to dry meat which has been cured in dry salt; about four hours to condition meat treated by the box cure process, and approximately six hours to condition meat which has been subjected to a sweet pickle cure. Very frequently circumstances require the conditioning, at the same time, of a batch of meat, portions of which may have been cured by these different processes, and it is, of course, desirable to complete the conditioning of the entire batch within substantially the same period of time. Briefly, I accomplish this result by dividing the batch into distinct portions, according to the type of cure or amount of moisture contained in the meat. I subject the distinct portions, simultaneously and separately, to different degrees of temperature, the temperature applied to the different portions being increased in proportion to the moisture contents. In this way the meats which have been subjected to the different curings will all be smoked and dried within the same period of time, thereby permitting the completion of the conditioning treatment of an entire batch in a single operation.

In order that the invention may be clear I have shown in the accompanying drawings an apparatus designed to carry out the method which has been above indicated in its broader aspects, the apparatus being designed primarily for the treatment of meat, but it will be understood that the invention may be applied to the treatment of substances other than meats, and, furthermore, with treating agents other than smoke may be used.

In the drawings:—

Fig. 1 is a longitudinal sectional view of the apparatus, and

Fig. 2 is a cross section on the line 2—2 of Fig. 1 looking in the direction of the arrows.

Referring to the drawings for a more detailed description, 10 indicates a house or container which is substantially closed and is provided with openings 11, 12 in one wall affording access to a loading and unloading chamber 13 formed by a substantially vertical partition 14 terminating at its upper end a considerable distance below the top 15 of a super-structure 16. The compartment is closed at its lower end 17 by a horizontal extension of the partition 14, and access may be had thereto from loading and unloading floors 18 adjacent the openings 11 and 12.

A vertical partition 19 extends upwardly from the base or support upon which the house is located and terminates at the lower end of the super-structure 16, thereby forming a treating or smoking chamber 20 having an inlet opening 21 at its upper end and an outlet opening 22, both of which communicate with the interior of the super-structure 16. Preferably, there is also provided, in conjunction with the smoking chamber a drying chamber, and, in the present instance, I have provided a plurality of such chambers 23, 24 separated, by a vertical partition 25, from each other, and by the partition 19 from the smoking chamber. Obviously, any desirable number of drying chambers may be provided, and the two indicated in the illustrated structure have an opening 26 leading from the super-structure 16 and are substantially closed from each other by the partition 25.

The invention contemplates the provision of means for conducting meats or other substances from the loading compartment through the smoking chamber and the drying chamber or chambers, and, preferably, again through the smoking chamber before its return to the loading and unloading chamber. The conveyor illustrated comprises a pair of spaced chains 28 carrying cross bars 29 therebetween and from which the meat may be suspended, as by hooks 30. The conveyor chains pass downwardly at the openings 11 and 12 over sprockets 30′ and then follow a path upwardly over sprockets 33 into the smoking chamber, through which the conveyor travels downwardly over drive sprockets 31 upon a shaft 31′ driven from a motor 32 and then upwardly, making its exit through the outlet opening 22 into the super-structure 16, in which are positioned pulleys 34 which direct the chains into the drying chamber.

As will be noted from the views, the conveyor follows a zigzag path of travel in the drying chamber 23 and then into the drying chamber 24, from which it passes back into the smoking chamber on its return to the loading and unloading compartment, where it is accessible through the openings 11 and 12 for the deposit thereon and removal therefrom of meats or other substances to be treated.

Any suitable means may be provided for introducing smoke or other gaseous treating agent into the smoking chamber, and, in the present instance, I have diagrammatically indicated at 37 smoke producing apparatus, such as is disclosed in detail in the patent to Alsop, 1,447,401, dated March 6, 1923. The apparatus, which need not be described in detail, comprises a hopper 38 for saw dust located upon the exterior of the house and adapted to deposit a layer of saw dust upon a traveling belt which extends into the chamber beneath the conveyor, suitable burners (not shown) being located beneath the belt to effect oxidation of the saw dust without its active combustion. Obviously, the invention is not limited to the use of this particular smoke producing means, which is shown only for the purpose of making the entire invention clear.

Within the smoking chamber are provided electrodes 40, these being disposed, preferably, as shown in Fig. 1, parallel to the runs of the conveyor, the electrodes being in the form of wires hung at their upper ends from suitable supports 41 insulated from the smoke house. The electrodes are free at their lower ends and are provided with suitable weights 42 to maintain them in proper position, although their lower ends could, of course, be fastened to insulating bars or supports similar to the bars or supports 41, at their upper ends. The electrodes are connected in any suitable manner with a source of electric current (not shown) and when connected in circuit, preferably, become the positive elements or anodes of the apparatus. The conveyor chains 28 and their sprockets are grounded in any suitable manner, as, for example, by the ground wire 43, so that they, together with the substances carried on the chain, become, preferably, the negative terminals or cathodes of the apparatus, and an electrical field is created through which the substances to be treated pass as they travel over the sprockets arranged, as shown, in the smoke house.

Further description of this feature of the invention is unnecessary since the same is disclosed in detail in the patents referred to hereinbefore, and it does not constitute a part of the present invention.

The drying chambers 23, 24 are, preferably, heated independently, as by means of steam coils 44 located below the runs of the conveyor, and by this arrangement the heat in the separate compartments may be independently regulated to maintain any suitable degree of temperature. The top of the house, above the drying chambers, is provided with flues 45, and to create a suitable draft of drying air the super-structure 15 has flues 46, the latter creating a draft permitting exhaust of the surplus smoke from the smoking chamber. Access to the smoking and drying compartments may be obtained through doors 47, and the compartment 23 has a door 48 permitting entrance to the chamber between the runs of the conveyor and grating 49 serving as a floor for the operator to permit inspection of the meats. Obviously, a similarly positioned entrance and support may be provided in the other drying compartment, as well as in the smoking chamber.

In the operation of the apparatus to carry out the method, the meats or other substances are deposited upon the conveyor through the openings 11, 12 and are carried by the conveyor in the direction indicated by the arrows into the smoking chamber and through the electrical field. The meats are placed upon the conveyor, preferably before they are dried and just after they have come from the soaking vats. While in this condition, and while being passed through the smoking chamber to the electrical field created therein, smoke is deposited upon the surface of the meat without drying the surface of the meat. This step takes but a few moments, ordinarily not more than thirty minutes. The meats are then carried into the drying chambers and when the conveyor is stopped they are allowed to stand for several hours until thoroughly dried. During the drying operation the smoke which has been previously deposited upon the wet meat is thoroughly diffused into the body of the meat, the surface not having been dried or hardened prior to the deposit of the smoke or other gaseous agent thereon. The period of time required for the drying operation varies, and depends, principally, upon the character of the cure to which the meat has been subjected. Generally, meat cured by dry salt will condition in about two hours; box cured meat will require, ordinarily, four hours, and it is not often possible to condition sweet pickled meat under six hours under the ordinary practice heretofore used.

Very often, when conditioning and treating a batch of meats, portions thereof will be found to require a longer period of time for conditioning due to greater moisture content. For example, some portions of a batch may have been cured by a sweet pickle process, whereas, another portion may have been cured in dry salt, or may have been subjected to a box-cure. By dividing the batch upon the conveyor so that the portions of substantially the same moisture content, or, in other words, that have been cured by the same process, are located in a single drying chamber, it is possible, by suitably regulating the temperature in the separate chambers, to complete the drying and conditioning of the entire batch within the same period of time. It has been found that a raise of 18° in temperature approximately doubles the moisture carrying capacity of air. This being the case, the temperature in the compartments is regulated so that the amount of heat varies directly as the moisture contents of the meats. For instance, in the compartment 23, if the box-cured meat is being dried, the temperature will be considerably lower than in the compartment 24, where, for example, meats cured by the sweet pickle process is being dried. As it is known that salt cured meat will condition in about one-third the time necessary for conditioning pickle cured meat it is merely necessary to increase the temperature in the chamber 24 36° F. so that double the amount of moisture will be carried out of the compartment as is carried out of the adjoining compartment 23, in which the salt-cured meat is being conditioned. In this manner the entire batch of meat is dried and conditioned and ready to be carried by the conveyor to the unloading compartment 13.

Preferably, as shown in the drawings, the conveyor, in returning to the unloading chamber, passes again through the smoking compartment and has therein a downward run 50 and an ascending run 51. By subjecting the meat to a final smoking and electrifying treatment it has imparted to it the desirable brilliant color, giving the same a varnish-like appearance. It has been found that when smoke is deposited on a warm dry surface it comes out a bright cherry color, whereas, during the initial smoking operation the surface of the meat turns a comparatively dull color. It is for this reason that the final smoking is given the meat while it is simultaneously electrified.

I claim:

1. The method of treating meat which consists in subjecting the meat to a cure, treating it with smoke without a drying heat and prior to drying, and then drying the meat.

2. The method of treating meat which consists in subjecting the meat to a cure, treating the meat with smoke prior to drying, then drying the meat and subsequently giving it a final smoking.

3. The method of treating edible substances which consists in subjecting the substances to a cure, smoking the substances and simultaneously electrifying them, and then drying them.

4. The method of treating edible substances which consists in subjecting the substances to a cure, smoking the substances and simultaneously electrifying them, then drying them, and subsequently giving them a final smoking while simultaneously electrifying them.

5. The method of treating meat which consists in subjecting the meat to a cure, smoking the meat and simultaneously electrifying it, and then drying the meat.

6. The method of treating meat which consists in subjecting the meat to a cure, smoking the meat and simultaneously electrifying it, then drying the meat and subsequently giving the meat a final smoking.

7. The method of treating meat which consists in subjecting the meat to a cure, smoking the meat and simultaneously electrifying it, then drying the meat and subsequently giving the meat a final smoking while simultaneously electrifying it.

8. The method of treating meat in batches, portions of which have been cured by different processes and vary in the amount of contained moisture, which consists in preliminarily conducting the entire batch through a smoke field and smoking the same uniformly, conveying the batch to suitable drying means, and separately and simultaneously subjecting the several portions thereof to different degrees of heat, the heat varying in direct ratio with the moisture whereby the several portions may be dried within substantially the same period of time.

9. The method of treating meat in batches, portions of which have been cured by different processes and vary in the amount of contained moisture, which consists in preliminarily conducting the entire batch through a smoke field and smoking the same uniformly, conveying the batch to suitable drying means, separately and simultaneously subjecting the several portions thereof to different degrees of heat, the heat varying in direct ratio with the moisture whereby the several portions may be dried within substantially the same period of time, and substantially immediately upon the termination of said drying period conducting the entire batch through a smoke field and giving the same a final smoking.

10. The method of drying particles of meat in batches, portions of which have been cured by different processes and vary in the amount of contained moisture, which consists in subdividing each batch into portions varying in moisture content and separately and simultaneously subjecting the several portions to different degrees of heat, the heat varying in direct ratio with the moisture whereby the several portions may be dried within substantially the same period of time.

11. The method of treating substances in batches, portions of which vary in moisture content, which consists in simultaneously smoking and electrifying the entire batch uniformly, and separately and simultaneously subjecting the several portions of the batch to different degrees of heat, the heat varying in direct ratio with the moisture whereby the several portions may be dried within substantially the same period of time.

12. The method of treating meat in batches, portions of which vary in moisture content, which consists in preliminarily and simultaneously smoking and electrifying the entire batch uniformly, and separately and simultaneously subjecting the several portions of the batch to different degrees of heat, the heat varying in direct ratio with the moisture whereby the several portions may be dried within substantially the same period of time.

13. The method of treating substances in batches, portions of which vary in moisture content, which consists in preliminarily and simultaneously smoking and electrifying the entire batch uniformly, separately and simultaneously subjecting the several portions of the batch to different degrees of heat, the heat varying in direct ratio with the moisture whereby the several portions may be dried within substantially the same portion of time, and subsequently smoking and simultaneously electrifying the entire batch.

14. The method of treating particles of meat in batches, portions of which vary in moisture content, which consists in preliminarily and simultaneously smoking and electrifying the entire batch uniformly, separately and simultaneously subjecting the several portions of the batch to different degrees of heat, the heat varying in direct ratio with the moisture whereby the several portions may be dried within substantially the same period of time, and subsequently smoking and simultaneously electrifying the entire batch.

15. Apparatus for effecting the continuous treatment of substances comprising a treating chamber, a drying chamber, an endless carrier having a path of travel through both chambers, means for creating an electrical field in said treating chamber, the carrier being adapted to convey the substances through said field, and means for introducing a gaseous agent into said treatment chamber.

16. Apparatus for effecting the continuous treatment of substances comprising a treating chamber, a drying chamber, an endless carrier having a path of travel through the treatment chamber, the drying chamber, and again through the treatment chamber, means for creating an electrical field in said treating chamber, the carrier being adapted to convey the substances through said field, and means for introducing a gaseous agent into said treatment chamber.

17. Apparatus for effecting the continuous smoking of meat comprising a treating chamber, a drying chamber, an endless carrier having a path of travel through both chambers, means for creating an electrical field in said treating chamber, the carrier being adapted to convey the meat through said field, and means for introducing smoke into said treatment chamber.

18. Apparatus for effecting the continuous smoking of meat comprising a treating chamber, a drying chamber, an endless carrier having a path of travel through the treatment chamber, the drying chamber and again through the treatment chamber, means for creating an electrical field in said treating chamber, the carrier being adapted to convey the meat through said field, and means for introducing smoke into said treatment chamber.

19. Apparatus for effecting the continuous treatment of meat comprising a substantially closed container, a smoking chamber in said container, a drying chamber in the container, an endless carrier mounted in said container for the deposit thereon and removal therefrom of meat, means for driving said carrier, said carrier having a path of travel through the smoking chamber, then through the drying chamber and again through the smoking chamber, means for creating an electrical field along and about the path of movement of said carrier through the smoking chamber, means for introducing smoke into said smoking chamber, and means for heating said drying chamber.

20. Apparatus for effecting the continuous treatment of meat comprising a substantially closed container, a smoking chamber in said container, a drying chamber in the container, an endless carrier mounted in said container and accessible from the outside of said container for the deposit thereon and removal therefrom of meat, means for driving said carrier, said carrier having a path of travel through the smoking chamber, then through the drying chamber and again through the smoking chamber, means for creating an electrical field along and about the path of movement of said carrier through the smoking chamber, means for introducing smoke into said smoking chamber, and means for heating said drying chamber.

21. Apparatus of the class described comprising a container, a smoking compartment in said container, a plurality of drying compartments in said container, an endless carrier mounted in said container, means for driving said carrier, the carrier having a path of travel through said smoking compartment and said drying comparments, means for creating an electrical field along and about the path of movement of said carrier in the smoking compartment, means for introducing smoke to said smoking compartment, and means for heating said drying compartments to different temperatures, the heat in said drying compartments being independently regulatable.

22. Apparatus of the class described comprising a container, a smoking compartment in said container, a plurality of drying compartments in said container, an endless carrier mounted in said container and accessible from the outside of said container for the deposit thereon and removal therefrom of meat, means for driving said carrier, the carrier having a path of travel through said smoking compartment and said drying compartments, means for creating an electrical field along and about the path of movement of said carrier in the smoking compartment, means for introducing smoke to said smoking compartment, and means for heating said drying compartments to different temperatures of heat, the heat in said drying compartments being independently regulatable.

23. Apparatus of the class described comprising a container, a smoking compartment in said container, a plurality of drying compartments in the container, an endless carrier mounted in said container, the container having an opening permitting the deposit of meat on the container and its removal therefrom, means for driving said carrier, the carrier having a path of travel through the smoking compartment, then through the drying compartments and, finally, again through the smoking compartments, means for creating an electrical field along and about the path of movement of said carrier through the smoking compartment, and means for independently heating said drying compartments whereby the compartments may be independently heated to the desired degree of temperature.

24. Apparatus of the class described comprising a smoking chamber and a plurality of drying chambers, an endless carrier having a path of travel through said chambers, means for driving said carrier, means for creating an electrical field along and about the path of movement of said carrier through the smoking chamber, means for heating said drying chamber, and means for introducing smoke into said smoking chamber.

25. Apparatus of the class described comprising a smoking chamber and a plurality of drying chambers, an endless carrier having a path of travel through said chambers, the carrier being adapted to pass through the smoking chamber a second time after traveling through the drying chambers, means for driving said carrier, means for creating an electrical field along and about the path of movement of said carrier through the smoking chamber, means for heating said drying chambers, and means for introducing smoke into said smoking chamber.

26. Apparatus of the class described comprising a substantially closed container, a loading and unloading compartment in said container, the container having openings in its wall through which said compartment is accessible, a smoking compartment in said container, a drying compartment in the container, means for introducing smoke into said smoking compartment, means for heating said drying compartment, an endless carrier having a path of travel through all of said compartments, means for driving said carrier, and means for creating an electrical field along and about the path of movement of said carrier through the smoking compartment.

27. Apparatus of the class described comprising a substantially closed container, a loading and unloading compartment in said container, a smoking compartment in the container and a plurality of drying compartments in the container, the container having an opening in its wall through which said loading and unloading compartment is accessible, means for introducing smoke into said smoking compartment, means for independently heating said drying compartments, an endless carrier having a path of travel through said compartments, means for driving said carrier, and means for creating an electrical field along and about the path of movement of said carrier through the smoking compartment.

28. Apparatus of the class described comprising a substantially closed container, a loading and unloading compartment in said container, a smoking compartment in the container and a plurality of drying compartments in the container, the container having an opening in its wall through which said loading and unloading compartment is accessible, means for introducing smoke into said smoking compartment, means for independently heating said drying compartments, an endless carrier having a path of travel through said compartments, the carrier being adapted to pass through said smoking compartment both before and after passing through the drying compartments, means for driving said carrier, and means for creating an electrical field along and about the path of movement of said carrier through the smoking compartment.

In testimony whereof I have hereunto set my hand.

LUCIUS F. LITTLE.